United States Patent
Hahn et al.

[11] Patent Number: 5,229,957
[45] Date of Patent: Jul. 20, 1993

[54] METHOD FOR TOLERANCE COMPENSATION OF A POSITION TRANSDUCER

[75] Inventors: Klaus Hahn, Bühlertal; Gerhard Kolberg, Bühl, both of Fed. Rep. of Germany

[73] Assignee: Robert Bosch GmbH, Stuttgart, Fed. Rep. of Germany

[21] Appl. No.: 578,896

[22] Filed: Sep. 4, 1990

Related U.S. Application Data

[63] Continuation-in-part of Ser. No. 146,370, Dec. 15, 1987, abandoned.

[30] Foreign Application Priority Data

Apr. 17, 1986 [DE] Fed. Rep. of Germany ....... 3612904

[51] Int. Cl.$^5$ .................. G06F 15/20; F02D 41/02
[52] U.S. Cl. .................. 364/571.05; 364/571.01; 364/431.05; 73/118.1
[58] Field of Search .............. 364/571, 577, 431.05, 364/571.05, 571.07, 571.01; 74/866; 73/118.1

[56] References Cited

U.S. PATENT DOCUMENTS

| | | | |
|---|---|---|---|
| 3,720,813 | 3/1973 | Badessa | |
| 4,366,541 | 12/1982 | Mouri et al. | 364/431.05 |
| 4,462,083 | 7/1984 | Schwefel | 364/571 |
| 4,490,804 | 12/1984 | Martinsons | 364/571 |
| 4,586,403 | 5/1986 | Lee et al. | 364/571 |
| 4,672,566 | 6/1987 | Asano et al. | 364/571 |
| 4,730,264 | 3/1988 | Kohler | 364/571 |

*Primary Examiner*—Vincent N. Trans
*Attorney, Agent, or Firm*—Michael J. Striker

[57] ABSTRACT

In a method for tolerance compensation of a position signal (W) of a position transducer, which has two mechanical end stops, first and second end values (W1, W2) of the position signal that are assigned to the two end stops and are stored in a read-write memory. Starting values (W1S, W2S) are stored in a read-write memory of the evaluation circuit and are set within the tolerance limits of the actual signal (Wd) detected by the position transducer. The starting values (W1S, W2S) are initially taken over as the ned values (W1, W2) into a read-write memory and cyclically compared with the actual or detected position signal (Wd). If a stored end value (W2) is exceeded by the detected position signal (Wd) or if within a predetermined time period (P) no position signal above the stored end value (W2) has been detected, the position signal is taken over as a new end value (W2) into the read-write memory, and the previous value is erased. The position signal is referred to a reference value ascertained from the two end values (W1, W2) and converted into a standardized output position signal (U).

3 Claims, 3 Drawing Sheets

METHOD FOR TOLERANCE COMPENSATION OF A POSITION TRANSDUCER

CROSS-REFERENCE TO RELATED APPLICATION

This is a continuation-in-part of application Ser. No. 146,370, filed Dec. 15, 1987, now abandoned.

BACKGROUND OF THE INVENTION

The invention is based on a method for tolerance compensation in a circuit for evaluation of a signal generated by a position transducer which includes a potentiometer coupled with a mechanical system, for example the driving pedal of a motor vehicle to serve as a transmitter of detected actual values for an engine power controlling or regulating system. In motor vehicles equipped with an electronic gas pedal having two mechanical end stops, a potentiometer mechanically coupled to the driving pedal of the vehicle is used as a set point transducer of the engine output (German Patent publication DE-OS 34 16 495). At its output, a circuit arrangement emits signal as a function of the resistance of the potentiometer, this signal representing the guide variable of an automatic (closed-loop) control for the engine output. A predetermined relationship must be maintained between the guide variable and the position of the driving pedal; in particular, the two mechanical end stops of the driving pedal must correspond exactly to idling and full-load operation of the engine. To maintain this relationship, the potentiometer must be manufactured with a close manufacturing tolerance, which at present is at ±5%. Furthermore, a time-consuming mechanical adjustment must be made when the position transducer comprising the driving pedal and the potentiometer is installed in the motor vehicle.

SUMMARY OF THE INVENTION

The method of the invention is characterized in that
a) for the at least one end stop of the position transducer, one starting value (W1S) of the position signal (W) is stored in a read-only memory of the evaluation circuit, with which starting value a predetermined position in the vicinity of the idling end stop corresponds, which position is run through upon the approach of the transducer to the idling end stop,
b) that the starting value is first taken over as an end value into a read-write memory of the evaluation circuit and cyclically compared with the (detected) value of the position signal, and
c) that if the end value (W2) stored in the read-write memory is exceeded or a predetermined time period (P) has expired, this end value is erased and the detected value is stored as a new end value in the read-write memory.

ADVANTAGES OF THE INVENTION

The method according to the invention has the advantage that the tolerance compensation is performed automatically with an adaptive algorithm each time the closed-loop circuit arrangement is put into operation. First two starting values are stored in a read-write memory of the evaluation unit, which provisionally serve as the end values assigned to the idling and full-load stops. If after operation has begun, detected position signals exceed or fail to attain these starting values, then the old end values are rewritten with the detected new values and taken over as new end values of the position signal assigned to the two end stops.

The cyclic adaptation of the end values corresponding to the two end stops of the position transducer makes it possible to broaden the installation and manufacturing tolerances. The method can be attained at little expense, and particularly in mass production in the automobile industry leads to considerable cost savings because the potentiometer is simpler to manufacture and the installation time is shortened.

By means of the characteristics recited in the dependent claims, advantageous further embodiments of the method disclosed in the main claim are possible. It is particularly advantageous if the position signal is referred to a value that is calculated from the two end values stored in the read-write memory.

It is advantageous to specify limit values for the measured position signal so that when they are exceeded or there is a failure to attain them, an error report is emitted immediately. Thus defects in the manufacture and installation of the position transducer can be recognized immediately, when the system is first put into operation.

Further details and advantages further embodiments of the method according to the invention will become apparent from the ensuring description.

DESCRIPTION OF THE PREFERRED EMBODIMENTS

Figure 1:
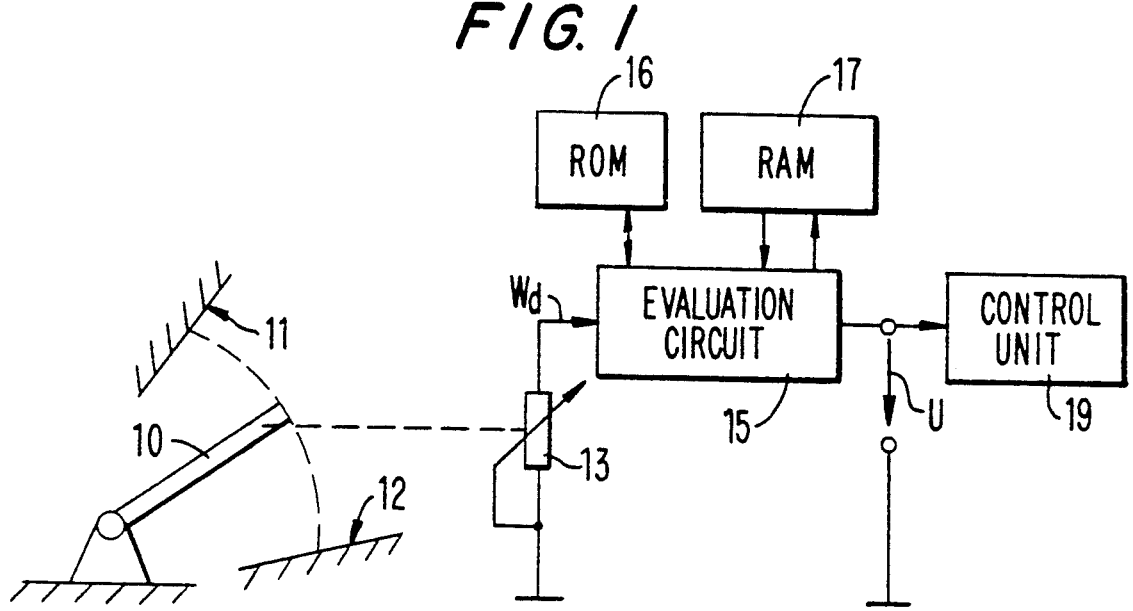
FIG. 1 shows a circuit arrangement for performing the method according to the invention.

FIG. 1 shows a driving pedal 10 of a motor vehicle which is movable between a first (idling) and second (full-load) stop 11, 12. A potentiometer 13 is mechanically coupled with the driving pedal 10. The position signal W that is picked up from the potentiometer 13 reaches an evaluation circuit 15, which has a read-only memory (ROM) 16 and a read-write memory (RAM) 17. An output signal U of the evaluation circuit 15 reaches a control unit 19.

Figure 2:
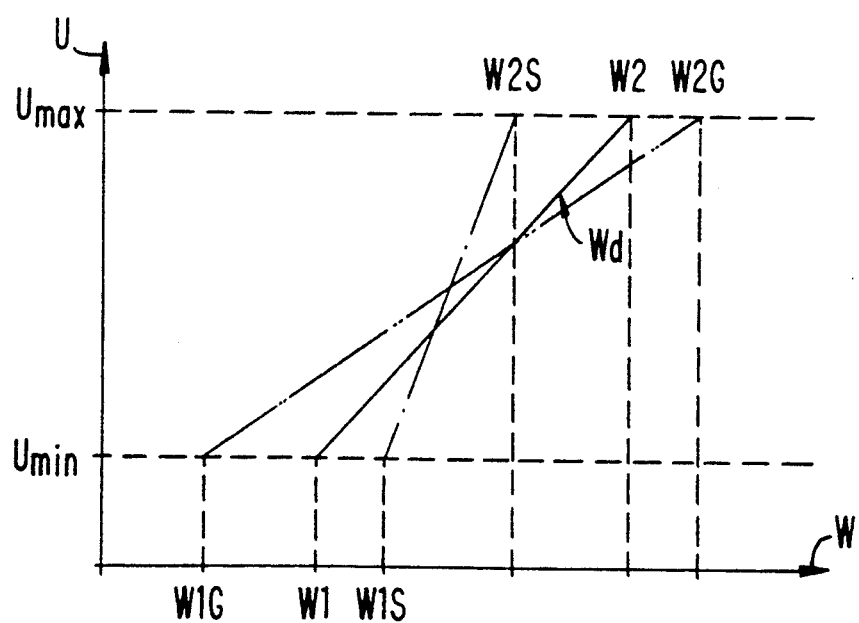
FIG. 2 illustrates a functional relationship between an output signal of the circuit arrangement and a position signal.

FIG. 2 shows the functional relationship between the position signal W and the output signal U. The output signal U is limited to a minimum value ($U_{min}$) and a maximum value $U_{max}$). The position signal W is characterized by the following characteristic values: W1 is a first end value assigned to the first (idling) end stop 11, and W2 is a second end value of the position signal W assigned to the second (full-load) end stop 12. The end values W1 and W2 are stored in the read-write memory 17. W1S is a predetermined first idling limit value, stored in the read-only memory 16 for the value W1, and W2S is a predetermined first full-load limit value, likewise stored in the read-only memory 16, for the value W2. W1G is a predetermined second idling limit value stored in the read-only memory 16 for the value W1, and W2G is a predetermined second full-load limit value likewise stored in the read-only memory 16 for the value W2. Wd designates a measured or detected value of the position signal W.

With the aid of the flow chart shown in FIG. 3, the tolerance compensation of the position signal W will now be described in detail. After the program start 20, the first idling limit and the first full-load limit values (W1S, W2S) are called up, in program step 21, from the read-only memory 16 and stored in the read-write memory 17 as starting values for the first and second end values W1, W2, respectively. In program step 22, a measured or detected value Wd of the position signal W is ascertained. In the next program step 23, the current measured value Wd is compared with the second idling limit value W1G stored in the read-only memory 16. The second idling limit value W1G is a lower limit for the measured value Wd of the position signal W corresponding to the first end stop 11. If the measured value Wd drops below the second idling limit value W1G, then in the program step 24 an error is recognized and displayed in step 25.

If the measured value Wd does not drop below the second idling limit value W1G, then in the next program step 26, monitoring is performed as to whether the second full-load limit value W2G is exceeded. The second full-load limit value W2G is an upper limit for the value of the position signal corresponding with the second end stop 12, a value which is reliably not exceeded during operation. If the detected value Wd is above W2G, however, then an error is determined in step 24 and displayed in step 25. If an error occurs, this indicates that either the manufacturing tolerance of the potentiometer 13 and/or the installation tolerance of the position transducer 10, 13 has been exceeded.

If no error has occurred from the failure to attain the second idling limit value W1G or, exceeding the second full-load limit value W2G in the program steps 23 and 26, then with the next program step 27 the learning or adaptation program for the end values W1, W2 assigned to the first and second end stops 11, 12, respectively, begins. If the measured value Wd at the idling end stop 11 fails to attain the starting value (W1S) for the value W1 stored in the read-write memory 17, then in the next program step 28, the stored first end value W1 is rewritten with the measured value Wd. In the next program step 29, the value Wd measured at the full-load end stop 12 is compared with the second end value W2 stored in the read-write memory 17. If the measured value Wd exceeds the second end value W2 stored in memory 17, then in program step 30 the stored end value W2 is rewritten with the measured value Wd. With the cyclic running of the program steps 27, 29 and, if applicable 28 and 30, the first end value W1 assigned to the first (idling) end stop 11 and the second end value W2 assigned to the second (full-load end stop 12 are adapted.

In the program step 31, the corrected position signal U corresponding to the output signal of the evaluation circuit 15, is determined. The measured value Wd of the position signal is standardized with reference to the two end values W1, W2 and the minimum and maximum value $U_{min}$, $U_{max}$ of the output signal U. The corrected position signal U is the product of the linear interpolation between the two pairs of values W2, $U_{max}$ and W1, $U_{min}$, taking into account the minimum value $U_{min}$ of the output signal U. The minimum and maximum values $U_{max}$, $U_{min}$ can be stored in the read-only memory 16 and each can be called up in the program step 31. Simplification is attained by setting the minimum value $U_{min}$ to 0. In the last program step 32, the corrected position value is emitted as an output signal U and reaches an open-loop or closed-loop control unit 19.

If the first and second end values W1, W2 assigned to the first and second end stop 11, 12 vary during driving because of temperature influences or from mechanical maladjustment, for example, then a correction of the first or second end value W1, W2 is effected in cyclic runs of the program.

Figure 3:
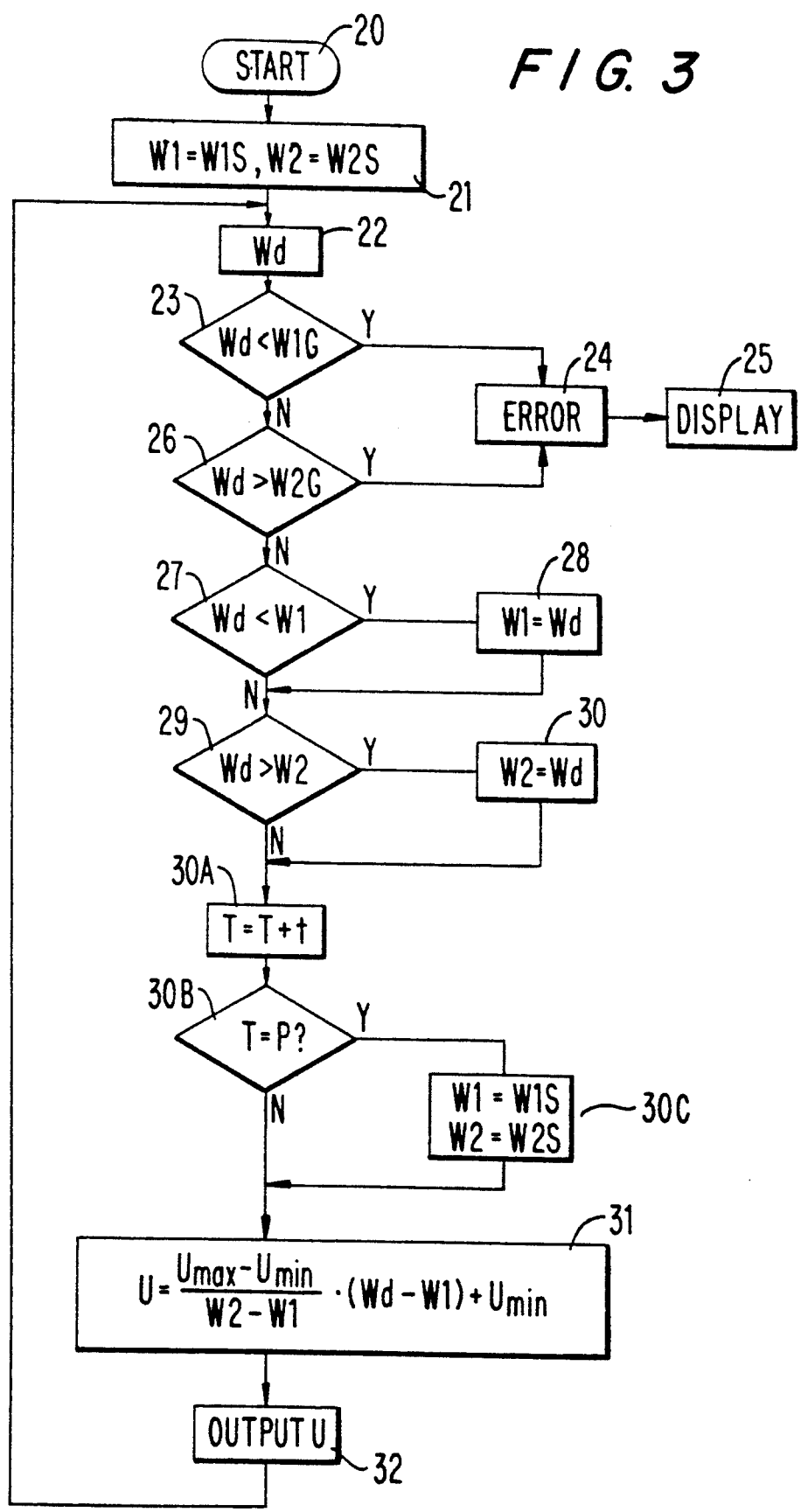
FIG. 3 is a flow chart of an embodiment of the method according to the invention.

In the exemplary embodiment of the method illustrated by FIG. 3, a correction of the first and second end values W1, W2 is effected only whenever the detected value Wd is smaller than the first end value W1 stored in the read-write memory, or greater than the second end value W2 stored in the memory 17. A requirement arising during driving for increasing the first end value W1 or decreasing the second end value W2 can be taken into account in the method according to the invention by incorporating a timing element T in the cyclically run part step 30A of the program shown in the flow chart of FIG. 3, where t designates a predetermined time increment. If after a predetermined time period P determined in the program step 30B the measured value Wd of the position signal no longer attains one or both of the stored end values W1, W2, then in the step 30C the end values W1, W2 are reset to their starting values W1S, W2S. During driving, there need be no fear of an effect from the possibly effected resetting of the end values W1, W2, if the time for cycling of the program is shorter than the shortest mechanical time constant of the overall system.

Figure 4:
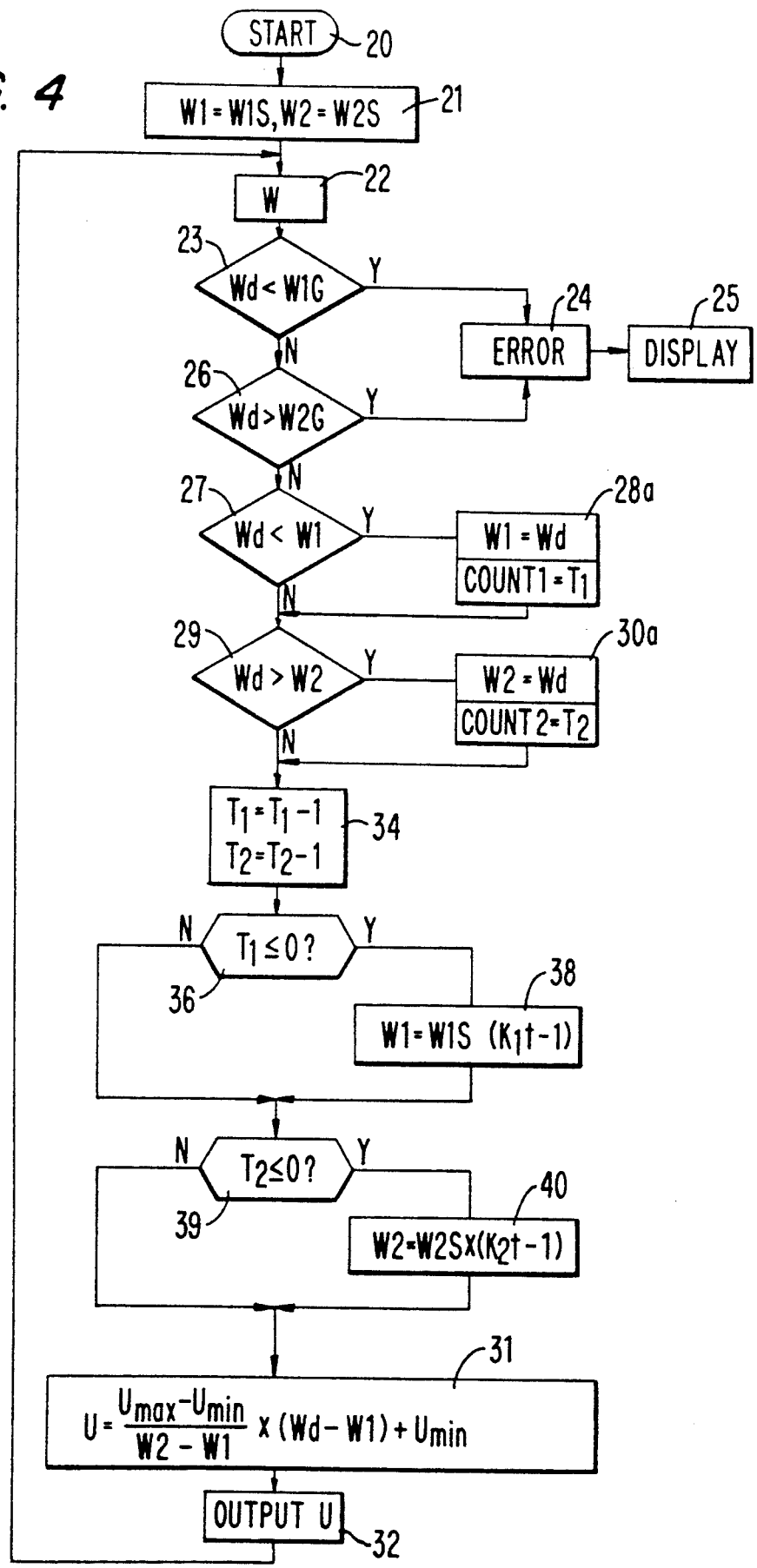
FIG. 4 is a flow chart of another embodiment of the method of the invention.

In the embodiment of the method shown by the flow chart of FIG. 4, the program steps 20-29 are the same as those in the method of FIG. 3. In the program steps 28a and 30a, counts of the counters Count1 and Count2 are reset to predetermined initial time values T1 and T2 each time when the corresponding end values W1 and-/or W2 in the read-write memory 17 are replaced by the detected position value Wd.

The adaptive method illustrated in FIG. 3 does not take into account changes in the regions of the end stops owing to which the end values W1 and W2 may become adapted in program steps 28 and 29 to magnitudes that are no longer within the reach of the detected position values Wd. Such changes can result, for example, from the temperature drift of electronic components of the position transducer or the evaluation circuit, or from mechanical changes of the end stops due to temperature fluctuations. Such changes can lead to an erroneous or inaccurate position signal which in turn negatively affects the safety and operability of the control system connected to the position transducer.

The embodiment of FIG. 4 avoids this disadvantage and improves the adaptive process by providing measures which guarantee that the adapted end values W1, W2 are always reset to their starting values W1S and/or W2S if during a predetermined time interval T1 and/or T2 the detected position signal Wd has not met the conditions set in program steps 27 and 28.

In the program step 23, the predetermined time values T1 and T2 are decremented by 1. In the subsequent program steps 36 and 39 interrogations are made whether the decremented values T1 and T2 have reached zero, that means whether time intervals corresponding to the values T1 and T2 have expired before the detected values Wd have reached the end value W1 and/or W2. If the result of interrogation is YES, then in the steps 38 and 40 the corresponding end values W1, W2 are replaced according to a time dependent linear ramp function to the respective starting values W1S and W2S. In the illustrated examples of the ramp functions (block 38 and 40), $k_1$ and $k_2$ denote given slope parameters of the ramp and t denotes a time dependent slop parameter range $0 \leq t \leq 1/k_1 (1/k_2)$. If the result of interrogation is NO, then the program continues with the steps 31 and 32 according to FIG. 3.

The time dependent resetting of the end values guarantees that no jumps in the control system which may be annoying to the operator will occur. Of course, the resetting can be accomplished according to different time dependent functions, for example by a step-wise ramp function.

The two end stops 11, 12 of the driving pedal 10 suitably do not match the end stops of the potentiometer 13. Only a certain portion of the possible travel is utilized. With this provision, accurate adjustment of the driving pedal 10 with respect to the potentiometer 13 is not necessary.

We claim:

1. A method for tolerance compensation of a position signal emitted by a position transducer, which includes a movable mechanical system having an end stop and a potentiometer coupled to the mechanical system to detect a position thereof and emit a corresponding position signal (W), comprising the steps of storing in a read-only memory a predetermined starting value (W2S) corresponding to a position which is run through by the potentiometer upon the approach of the mechanical system to the end stop;

reading the starting value from the read-only memory and storing the same as an end value (W2) in a read-write memory;

cyclically comparing the stored end value (W2) with a detected value (Wd) of the position signal;

if the detected value (Wd) exceeds the stored end value (W2), erasing the end value and storing in the read-write memory the detected value as a new end value (W2);

if after a predetermined time period (P) the detected value has not reached the stored end value (W2), resetting the end value (W2) to the starting value (W2S);

determining from the stored end value a tolerance compensated position value emitted as an output signal (U) having a predetermined maximum and minimum value stored in said read-write memory; standardizing the tolerance compensated position values between said maximum and minimum values; determining said tolerance compensated position value by a linear interpolation between the end value (W2) and maximum and minimum values; storing a second predetermined limit value (W2G) assigned to said end stop in said read-only memory; cyclically comparing the detected value (Wd) with said second limit value; and displaying an error message when said limit value is exceeded.

2. A method for tolerance compensation of a position signal emitted by a position transducer, which includes a movable mechanical system installed in a motor vehicle and having an end stop, a driving pedal movable between an idling end stop and the full-load end stop, and a potentiometer coupled to the mechanical system to detect a position thereof and emit a corresponding position signal (W), comprising the steps of storing in a read-only memory a predetermined starting value (W2S) corresponding to a position which is run through by the potentiometer upon the approach of the mechanical system to the end stop;

reading the starting value from the read-only memory and storing the same as an end value (W2) in a read-write memory;

cyclically comparing the stored end value (W2) with a detected value (Wd) of the position signal;

if the detected value (Wd) exceeds the stored end value (W2), erasing the end value and storing in the read-write memory the detected value as a new end value (W2);

if after a predetermined time period (P) the detected value has not reached the stored end value (W2), resetting the end value (W2) to the starting value (W2S);

determining from the stored end value a tolerance compensated position value emitted as an output signal (U);

storing in the read-only memory another predetermined starting value (W1S) corresponding to a limit position of the potentiometer upon the approach of the mechanical system to the idling end stop;

reading the other starting value (W1S) from the read-only memory and storing the same as another end value (W1) in the read-write memory;

cyclically comparing the stored other end value (W1) with the detected value of the position signal;

if the detected value is below the stored other end value, erasing the other end value and storing in the read-write memory the detected value as a new other end value (W1);

if after the predetermined time period (P) the detected value has exceeded the stored other end value (W1), resetting the other end value to said other starting value (W1S); and determining from the stored two end values (W2, W1) a tolerance compensated position value emitted as an output signal.

3. A method for tolerance compensation of a position signal emitted by a position transducer, which includes a movable mechanical system installed in a motor vehicle and having an idling end stop, a full-load end stop, a driving pedal movable between the end stops, and a potentiometer coupled to the driving pedal to detect a position thereof and emit a corresponding position signal (W), comprising the steps of storing in a read-only memory a first pair of limit values (W1S, W2S) corresponding to limit positions of the potentiometer upon the approach of the driving pedal to the respective end stop;

storing in the read-only memory a second pair of limit values (W1G, W2G) assigned to the respective end stops;

reading the first pair of limit values from the read-only memory and storing the same as end values (W1, W2) in a read-write memory;

cyclically comparing the stored end values with a detected value (Wd) of the position signal;

if the detected value exceeds the stored end value (W2) assigned to the full-load end stop and/or is below the stored end value (W1) assigned to the idling end stop, erasing the corresponding end values and storing instead in the read-write memory the detected value as new end values (W1 and/or W2);

setting predetermined time values (T1, T2) for the respective end values (W1, W2);

if during the time values (T1, T2) no replacement of the end values has occurred in the read-write memory cyclically decrementing the time values;

if zero time value (T1 and T2) is reached, erasing in the read-write memory the corresponding end value (W1S, W2S) from said firs pair of limit values;

determining from the stored two end values a tolerance compensated position value emitted as an output signal (U); and restoring the corresponding value of the first pair of limit values according to a time-dependent ramp function after a decremented time value (T1 and/or T2) has reached zero.

* * * * *